United States Patent
Lee et al.

(10) Patent No.: US 8,054,161 B2
(45) Date of Patent: Nov. 8, 2011

(54) APPARATUS AND METHOD FOR TRANSMIT LEAKAGE SIGNAL SUPPRESSION IN RFID READER

(75) Inventors: Donghan Lee, Daejeon (KR); Ji-Hoon Bae, Daejeon (KR); Cheng-Hao Quan, Daejeon (CN); Kwang-Soo Cho, Daejeon (KR); Gil Young Choi, Daejeon (KR); Jong-Suk Chae, Daejeon (KR); Sang-Gi Kang, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 575 days.

(21) Appl. No.: 12/328,385

(22) Filed: Dec. 4, 2008

(65) Prior Publication Data

US 2010/0026460 A1    Feb. 4, 2010

(30) Foreign Application Priority Data

Jul. 31, 2008   (KR) .................. 10-2008-0074923

(51) Int. Cl.
| | |
|---|---|
| *H04Q 5/22* | (2006.01) |
| *G08B 1/08* | (2006.01) |
| *H04K 3/00* | (2006.01) |
| *H04B 17/00* | (2006.01) |
| *H04B 1/04* | (2006.01) |
| *H04B 1/10* | (2006.01) |

(52) U.S. Cl. ....... 340/10.1; 455/1; 455/63.1; 455/114.2; 455/296; 340/539.1; 340/539.22

(58) Field of Classification Search .................. 333/156; 342/194–198; 340/10.1–10.6, 572.1–572.9, 340/539.1, 539.22; 235/375–385; 455/1, 455/63.1, 101, 296
See application file for complete search history.

(56) References Cited

U.S. PATENT DOCUMENTS

| | | | | |
|---|---|---|---|---|
| 5,861,837 A * | 1/1999 | Richardson et al. | .......... | 342/198 |
| 6,107,910 A * | 8/2000 | Nysen | .......... | 340/10.1 |
| 6,507,253 B1 * | 1/2003 | Matsuyoshi et al. | .......... | 333/156 |
| 7,671,720 B1 * | 3/2010 | Martin et al. | .......... | 340/10.1 |
| 7,684,751 B2 * | 3/2010 | Posamentier | .......... | 455/1 |
| 7,873,318 B2 * | 1/2011 | Nagai et al. | .......... | 455/63.1 |
| 7,898,418 B2 * | 3/2011 | Safarian et al. | .......... | 340/572.1 |
| 8,000,674 B2 * | 8/2011 | Sajid et al. | .......... | 455/296 |

(Continued)

FOREIGN PATENT DOCUMENTS

KR    100872405 B1    12/2008

*Primary Examiner* — George Bugg
*Assistant Examiner* — Renee Dorsey
(74) *Attorney, Agent, or Firm* — Kile Park Goekjian Reed & McManus PLLC (57) ABSTRACT

A method and apparatus for suppressing a transmit leakage signal of a radio frequency identification (RFID) reader is provided. The apparatus includes: a first power distributor distributing a transmission signal to output a first transmission signal and a second transmission signal; a second power distributor distributing the second transmission signal to output a third transmission signal and a fourth transmission signal; a first amplitude/phase converter converting an amplitude and a phase of the first transmission signal to generate a first converted signal; a second amplitude/phase converter converting an amplitude and a phase of the third transmission signal to generate a second converted signal; a first power combiner combining the first converted signal with a first leakage signal generated in association with the fourth transmission signal; and a second power combiner combining the second converted signal with a second leakage signal generated in association with the fourth transmission signal.

20 Claims, 8 Drawing Sheets

U.S. PATENT DOCUMENTS

| | | | |
|---|---|---|---|
| 2004/0038648 A1* | 2/2004 | Matsuura et al. | 455/101 |
| 2006/0087473 A1* | 4/2006 | Song et al. | 342/194 |
| 2006/0098765 A1 | 5/2006 | Thomas et al. | |
| 2008/0079547 A1* | 4/2008 | Alicot et al. | 340/10.3 |
| 2009/0058604 A1* | 3/2009 | Jung et al. | 340/10.1 |
| 2009/0186582 A1* | 7/2009 | Muhammad et al. | 455/63.1 |

* cited by examiner

FIG. 1

<ANTENNA SEPARATION TYPE>

<ANTENNA INTEGRATION TYPE>

APPARATUS AND METHOD FOR TRANSMIT LEAKAGE SIGNAL SUPPRESSION IN RFID READER

CROSS-REFERENCE TO RELATED APPLICATION

This application claims priority from Korean Patent Application No. 10-2008-0074923, filed on Jul. 31, 2008, in the Korean Intellectual Property Office, the entire disclosure of which is incorporated herein by reference.

BACKGROUND OF THE INVENTION

1. Field of the Invention

Embodiments relate to a radio frequency identification (RFID) reader in an RFID system.

2. Description of Related Art

Generally, a radio frequency identification (RFID) system includes an RFID tag for storing information and exchanging data using protocols, and a reader, i.e. an RFID reader for wirelessly communicating with the RFID tag. The RFID tag is classified into an active type that requires power from a power supply and a passive type that operates by an electromagnetic field of the RFID reader without directly receiving power from an internal or external power supply.

The RFID tag may be formed in various types of shapes. Accordingly, the RFID tag may be inserted into a plastic disc, a cylinder, a card, a thin flexible band, a hollow glass bead, and the like. Examples of the RFID tag include a single-bit read-only tag that is used for security, a 32-bit or 64-bit read-only tag with unique codes that can identify each tag, a 512 kb read and write tag that a user can arbitrarily correct contents of a memory, and the like. The RFID tag generally uses frequency bands of 125.134 KHz, 13.56 MHz, 433 MHz, 860 MHz to 960 MHz, or 2.45 GHz.

The RFID reader is also referred to as an interrogator and includes an RF unit that enables communication with the RFID tag using RF energy. The RFID reader may be in a portable form or in a fixed form to receive a signal from the RFID tag and read data included in the signal.

A passive RFID system of an ultra high frequency (UHF) band uses a backscattering scheme and thus, the magnitude of a signal emitted from the RFID reader is significantly greater than the magnitude of a backscattered signal of the RFID tag. Accordingly, in the RFID system, the RFID reader may not correctly recognize the signal of the RFID tag.

SUMMARY OF THE INVENTION

An aspect of the present invention provides an apparatus and method that can control leakage signals with a different amplitude and phase using two independent amplitude/phase converters and thereby effectively suppress the leakage signals.

Another aspect of the present invention also provides an apparatus and method that can effectively suppress leakage signals that occur via internal and external paths and thereby effectively improve an isolation between transmission and reception.

Another aspect of the present invention also provides an apparatus and method that can effectively improve an isolation between transmission and reception, and thereby improve an identification rate and an identification distance of a radio frequency identification (RFID) system.

According to an aspect of the present invention, there is provided an apparatus for suppressing a transmit leakage signal of an RFID reader, the apparatus including: a first power distributor distributing a transmission signal to output a first transmission signal and a second transmission signal; a second power distributor distributing the output second transmission signal to output a third transmission signal and a fourth transmission signal; a first amplitude/phase converter converting an amplitude and a phase of the output first transmission signal to generate a first converted signal; a second amplitude/phase converter converting an amplitude and a phase of the output third transmission signal to generate a second converted signal; a first power combiner combining the first converted signal with a first leakage signal that is generated in association with the output fourth transmission signal; and a second power combiner combining the second converted signal with a second leakage signal that is generated in association with the output fourth transmission signal.

According to another aspect of the present invention, there is provided an apparatus for suppressing a transmit leakage signal of an RFID reader, the apparatus including: a first power distributor distributing a transmission signal to output a first transmission signal and a second transmission signal; a second power distributor distributing the output second transmission signal to output a third transmission signal and a fourth transmission signal; a first amplitude/phase converter converting an amplitude and a phase of the output third transmission signal to generate a first converted signal; a second amplitude/phase converter converting an amplitude and a phase of the output fourth transmission signal to generate a second converted signal; a first power combiner combining the first converted signal and the second converted signal; and a second power combiner combining an output signal of the first power combiner with a first leakage signal and a second leakage signal that are generated in association with the output first transmission signal.

According to still another aspect of the present invention, there is provided a method of suppressing a transmit leakage signal of an RFID reader, the method including: distributing a transmission signal to output a first transmission signal and a second transmission signal; distributing the output second transmission signal to output a third transmission signal and a fourth transmission signal; converting an amplitude and a phase of the output first transmission signal to generate a first converted signal; converting an amplitude and a phase of the output third transmission signal to generate a second converted signal; combining the first converted signal with a first leakage signal that is generated in association with the output fourth transmission signal; and combining the second converted signal with a second leakage signal that is generated in association with the output fourth transmission signal.

According to yet another aspect of the present invention, there is provided a method of suppressing a transmit leakage signal of an RFID reader, the method including: distributing a transmission signal to output a first transmission signal and a second transmission signal; distributing the output second transmission signal to output a third transmission signal and a fourth transmission signal; converting an amplitude and a phase of the output third transmission signal to generate a first converted signal; converting an amplitude and a phase of the output fourth transmission signal to generate a second converted signal; combining the first converted signal and the second converted signal by reflecting a first leakage signal and a second leakage signal that are generated in association with the output first transmission signal; and combining an output signal according to combining, with the first leakage signal and the second leakage signal.

According to embodiments of the present invention, it is possible to control leakage signals with a different amplitude and phase using two independent amplitude/phase converters and thereby effectively suppress the leakage signals.

Also, according to embodiments of the present invention, it is possible to effectively suppress leakage signals that occur via internal and external paths and thereby effectively improve an isolation between transmission and reception.

Also, according to embodiments of the present invention, it is possible to effectively improve an isolation between transmission and reception and thereby improve an identification rate and an identification distance of an RFID system.

The present invention is not limited to the above purposes and other purposes not described herein will be apparent to those of skill in the art from the following description.

BRIEF DESCRIPTION OF THE DRAWINGS

The above and other aspects of the present invention will become apparent and more readily appreciated from the following detailed description of certain exemplary embodiments of the invention, taken in conjunction with the accompanying drawings of which.

DETAILED DESCRIPTION OF EXEMPLARY EMBODIMENTS

Reference will now be made in detail to exemplary embodiments of the present invention, examples of which are illustrated in the accompanying drawings, wherein like reference numerals refer to the like elements throughout. The exemplary embodiments are described below in order to explain the present invention by referring to the figures.

A passive radio frequency identification (RFID) system includes an RFID reader and an RFID tag. The passive RFID system may supply the RFID reader with energy for operating the RFID tag. The RFID tag may backscatter the energy supplied from the RFID reader. The RFID tag may differently modulate the magnitude of the backscattered signal according to transmission information.

Accordingly, in order to supply energy to the RFID tag for a predetermined period of time, the RFID reader may simultaneously perform an operation of transmitting a transmission signal and an operation of receiving information from the RFID tag. Also, the RFID reader may ensure an isolation between transmission and reception by separating a transmit antenna and a receive antenna from each other, or by integrating the transmit antenna and the receive antenna using a circulator. The former corresponds to an antenna separation type and the latter corresponds to an antenna integration type.

Figure 1:
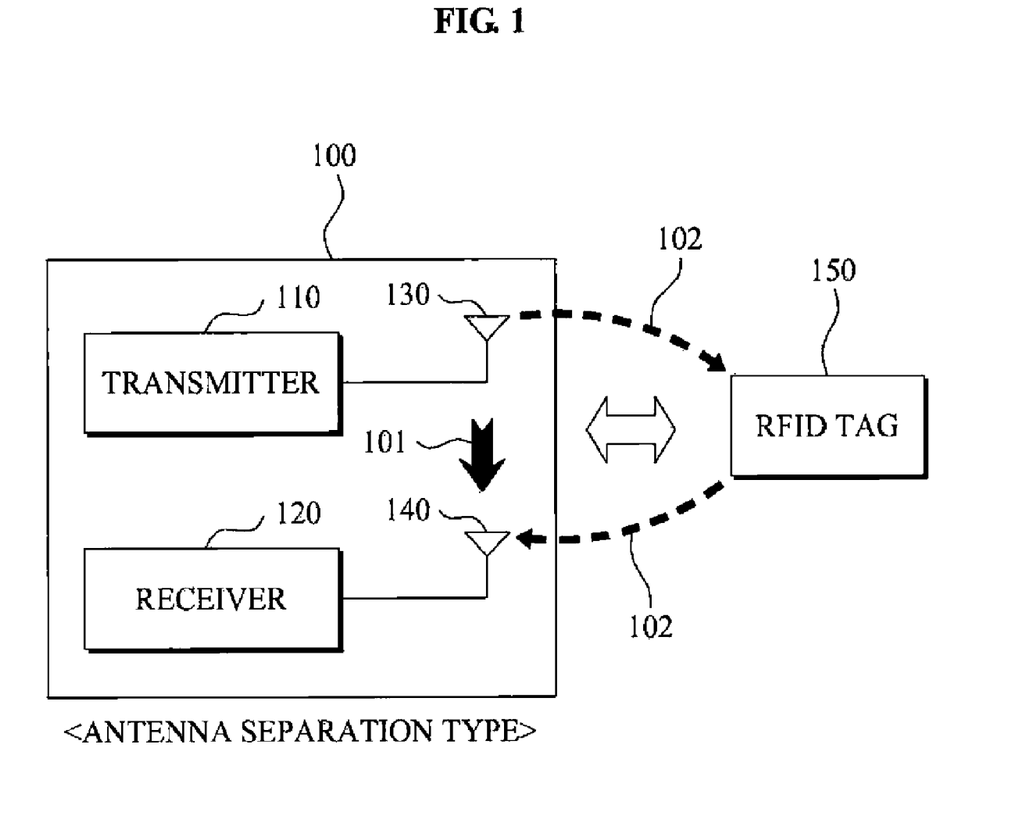
FIG. 1 illustrates a radio frequency identification (RFID) system including an antenna separation type of an RFID reader according to an embodiment of the present invention.

FIG. 1 illustrates an RFID system including an antenna separation type of an RFID reader 100 according to an embodiment of the present invention.

Referring to FIG. 1, the RFID system includes the antenna separation type of the RFID reader 100 and an RFID tag 150.

The RFID reader 100 includes a transmitter 110, a receiver 120, a transmit antenna 130, and a receive antenna 140.

The transmitter 110 may output a transmission signal and transmit the output transmission signal to the transmit antenna 130. The transmit antenna 130 may receive the transmission signal and transmit the received transmission signal to the RFID tag 150. The RFID tag 150 may receive the transmission signal from the transmit antenna 130 and transmit transmission information in response to the received transmission signal. The receive antenna 140 may receive the transmission information from the RFID tag 150 and transfer the received transmission information to the receiver 120. The receiver 120 may receive the transmission information from the receive antenna 140 and process the received transmission information.

During the above transmission and reception process, leakage signals 101 and 102 corresponding to interference signals may occur due to a transmit leakage. Generally, the transmission signals 101 and 102 may occur via two paths. Firstly, when surrounding environments of the transmit antenna 130 and the receive antenna 140 are fixed or insignificantly change, the transmission signal 101 may occur in the RFID reader 100. Secondly, when the RFID reader 100 identifies the RFID tag 150 attached to various types of articles, for example, paper, wood, plastic, metal, and the like, the leakage signal 102 may occur. Specifically, the leakage signal 102 may occur according to the change in the surrounding environments of the transmit antenna 130 and the receive antenna 140.

Figure 2:
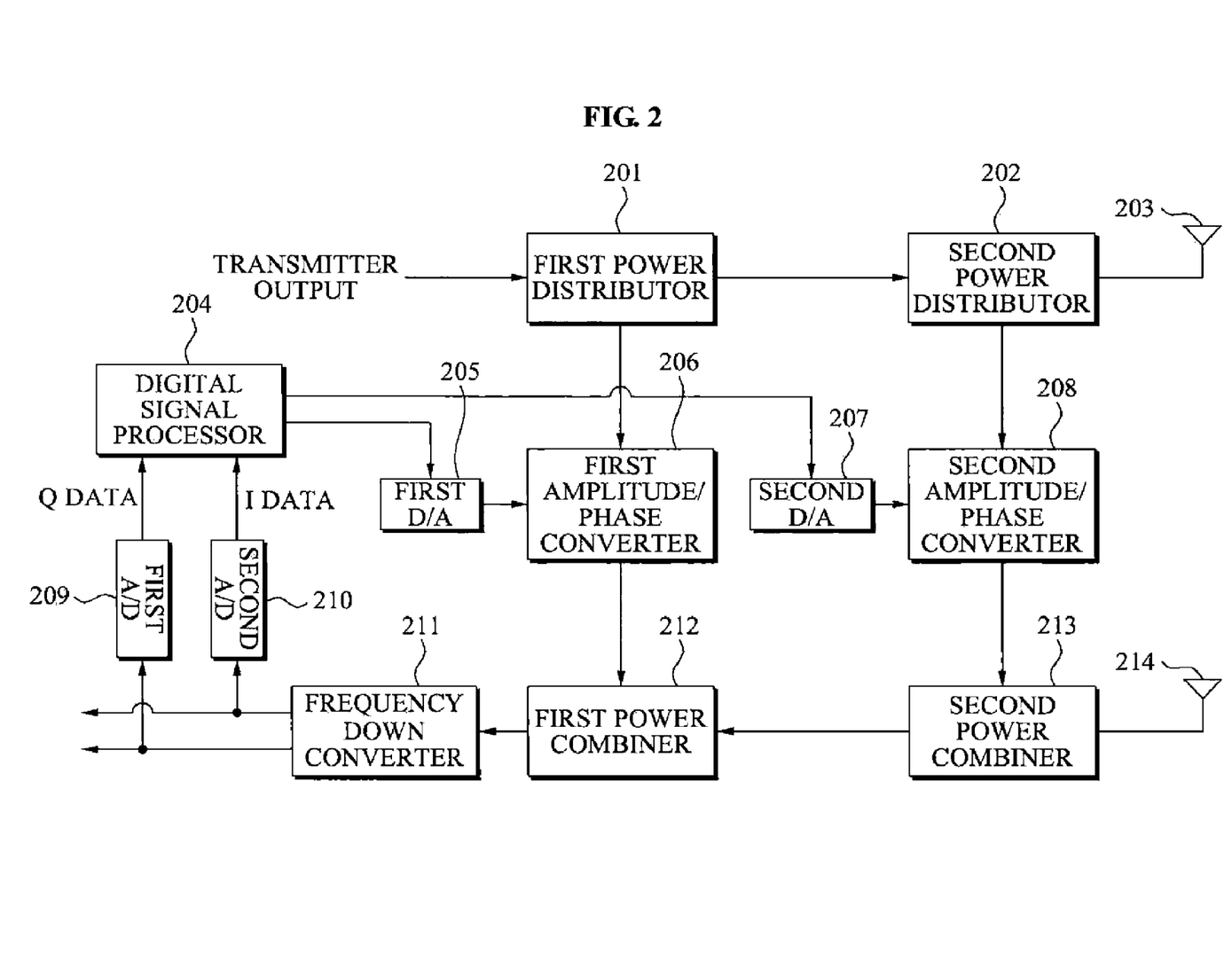
FIG. 2 is a block diagram illustrating an apparatus for suppressing a transmit leakage signal of an RFID reader according to an embodiment of the present invention.

FIG. 2 is a block diagram illustrating an apparatus for suppressing a transmit leakage signal of an RFID reader according to an embodiment of the present invention. Here, the apparatus for suppressing the transmit leakage signal may be installed in the RFID reader 100 of FIG. 1, that is, an antenna separation type RFID reader.

Referring to FIG. 2, the apparatus for suppressing the transmit leakage signal of the RFID reader may include a first power distributor 201, a second power distributor 202, a digital signal processor 204, a first digital-to-analog (D/A) converter 205, a first amplitude/phase converter 206, a second D/A converter 207, a second amplitude/phase converter 208, a first analog-to-digital (A/D) converter 209, a second A/D converter 210, a frequency down converter 211, a first power combiner 212, and a second power combiner 213.

The first power distributor 201 may distribute a transmission signal to output a first transmission signal and a second transmission signal. The first power distributor 201 may transfer the output first transmission signal to the first amplitude/phase converter 206 and transfer the output second transmission signal to the second power distributor 202. In an actual embodiment, the first power distributor 201 may be replaced with a directional coupler and the like.

The second power distributor 202 may receive the second transmission signal from the first power distributor 201, and distribute the output second transmission signal to output a third transmission signal and a fourth transmission signal. The second power distributor 202 may transfer the output third transmission signal to the second amplitude/phase converter 208 and transfer the output fourth transmission signal to a transmit antenna 203. In an actual embodiment, the second power distributor 202 may be replaced with a directional coupler and the like.

The digital signal processor 204 may detect a first leakage signal that is generated in association with the fourth transmission signal. The digital signal processor 204 may generate a first digital control signal for generating of a first converted signal based on the detected first leakage signal. The first converted signal will be described later. The first leakage signal may be an internal leakage signal that occurs in the RFID reader.

The first D/A converter 205 may convert the first digital control signal, generated by the digital signal processor 204, to an analog signal to thereby output a first analog control signal. The first D/A converter 205 may transfer the output first analog control signal to the first amplitude/phase converter 206. The first D/A converter 205 may control and convert each of amplitude and a phase. Therefore, in an actual embodiment, the first D/A converter 205 may be constructed in a manner that two D/A converters constitute a pair.

The first amplitude/phase converter 206 may convert the amplitude and the phase of the first transmission signal output from the first power distributor 201 to thereby generate the first converted signal. For this, the first amplitude/phase converter 206 may use the first analog control signal output from the first D/A converter 205.

Specifically, the first amplitude/phase converter 206 may convert the amplitude of the output first transmission signal to be the same as an amplitude of the first leakage signal using the first analog control signal to thereby generate the first converted signal. The first amplitude/phase converter 206 may convert the phase of the output first transmission signal to be an inverse phase, that is, 180 degrees of the first leakage signal, using the first analog control signal to thereby generate the first converted signal.

The digital signal processor 204 may detect a second leakage signal that is generated in association with the fourth transmission signal. The digital signal processor 204 may generate a second digital control signal for generating of a second converted signal based on the detected second leakage signal. The second converted signal will be described later. The second leakage signal may be an external leakage signal that occurs according to the change in surrounding environments of the transmit antenna 203 and a receive antenna 214.

The second D/A converter 207 may convert the second digital control signal, generated by the digital signal processor 204, to an analog signal to thereby output a second analog control signal. The second D/A converter 207 may transfer the output second analog control signal to the second amplitude/phase converter 208. The second D/A converter 207 may control and convert each of an amplitude and a phase. Therefore, in an actual embodiment, the second D/A converter 207 may be constructed in a manner that two D/A converters constitute a pair.

The second amplitude/phase converter 208 may convert the amplitude and the phase of the third transmission signal output from the second power distributor 202 to thereby generate the second converted signal. For this, the second amplitude/phase converter 208 may use the second analog control signal output from the second D/A converter 207.

Specifically, the second amplitude/phase converter 208 may convert the amplitude of the output third transmission signal to be the same as an amplitude of the second leakage signal using the second analog control signal to thereby generate the second converted signal. The second amplitude/phase converter 208 may convert the phase of the output third transmission signal to be an inverse phase, that is, 180 degrees of the second leakage signal using the second analog control signal to thereby generate the second converted signal.

The first power combiner 212 may combine the first converted signal and the first leakage signal. Specifically, the first power combiner 212 may combine the first leakage signal with the first converted signal that has the same amplitude and the inverse phase of the first leakage signal to offset the amplitude and the phase of the first leakage signal and thereby suppress the first leakage signal.

Also, the first power combiner 212 may combine an output signal from the second power combiner 213 with the first converted signal from the first amplitude/phase converter 206 and thereby suppress the first leakage signal. In an actual embodiment, the first power combiner 212 may be replaced with a directional coupler and the like.

The second power combiner 213 may combine the second converted signal and the second leakage signal. The second power combiner 213 may combine a signal, including the second leakage signal and an RFID tag response signal received from the receive antenna 214, with the second converted signal received from the second amplitude/phase converter 208 to offset the amplitude and the phase of the second leakage signal and thereby suppress the second leakage signal. In an actual embodiment, the second power combiner 213 may be replaced with a directional coupler and the like.

The frequency down converter 211 may down-convert an output signal of the first power combiner 212 to an analog baseband signal. The frequency down converter 211 may down-convert an output signal of the second power combiner 213 to an analog baseband signal.

The frequency down converter 211 may demodulate a signal in which the second leakage signal is removed in the RFID tag response signal, that is, the signal received from the receive antenna 214 to thereby recover transmission information received from the RFID tag.

The first A/D converter 209 may convert the down-converted output signal of the first power combiner 212 to a digital baseband signal to supply the converted digital baseband signal to the digital signal processor 204. When the frequency down converter 211 is an I/Q demodulator, the first A/D converter 209 may perform digital signal conversion for data of a quadrature-phase (Q) channel.

The second A/D converter 210 may convert the down-converted output signal of the first power combiner 212 to a digital baseband signal to supply the converted digital baseband signal to the digital signal processor 204. When the frequency down converter 211 is the I/Q demodulator, the second A/D converter 210 may perform digital signal conversion for data of an in-phase (I) channel.

According to an aspect of the present invention, the first amplitude/phase converter 206 and the first power combiner 212 may suppress the first leakage signal occurring in the RFID reader. The second power combiner 213 and the second amplitude/phase converter 208 may suppress the second leakage signal occurring according to the change in surrounding environments of the transmit antenna 203 and the receive antenna 214.

According to another aspect of the present invention, the first amplitude/phase converter 206 and the first power combiner 212 may suppress the second leakage signal occurring according to the change in surrounding environments of the transmit antenna 203 and the receive antenna 214. The second power combiner 213 and the second amplitude/phase converter 208 may suppress the first leakage signal occurring in the RFID reader.

As described above, according to an aspect of the present invention, it is possible to effectively suppress the first leakage signal and the second leakage signal with a different amplitude and phase by controlling the first leakage signal and the second leakage signal using two independent amplitude/phase converters, for example, the first amplitude/phase converter 206 and the second amplitude/phase converter 208.

Figure 3:
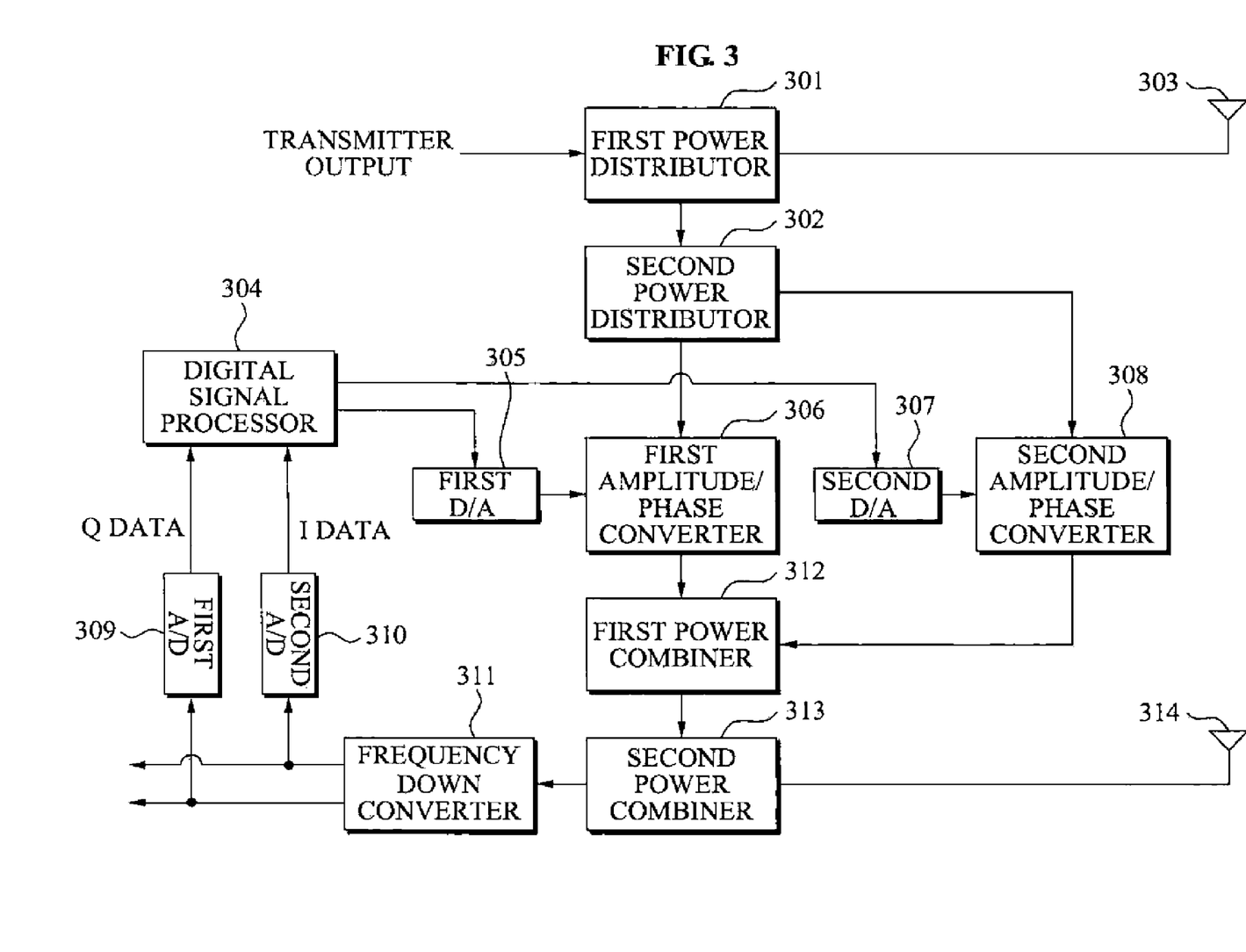
FIG. 3 is a block diagram illustrating an apparatus for suppressing a transmit leakage signal of an RFID reader according to another embodiment of the present invention.

FIG. 3 is a block diagram illustrating an apparatus for suppressing a transmit leakage signal of an RFID reader according to another embodiment of the present invention. Here, the apparatus for suppressing the transmit leakage signal may be installed in the RFID reader 100 of FIG. 1, that is, an antenna separation type RFID reader.

Referring to FIG. 3, the apparatus for suppressing the transmit leakage signal of the RFID reader may include a first power distributor 301, a second power distributor 302, a digital signal processor 304, a first D/A converter 305, a first amplitude/phase converter 306, a second D/A converter 307, a second amplitude/phase converter 308, a first A/D converter 309, a second A/D converter 310, a frequency down converter 311, a first power combiner 312, and a second power combiner 313.

The first power distributor 301 may distribute a transmission signal to output a first transmission signal and a second transmission signal. The first power distributor 301 may transfer the output first transmission signal to a transmit antenna 303 so that the first transmission signal may be transmitted to an RFID tag (refer to the RFID tag 150 of FIG. 1) via the transmit antenna 303. The first power distributor 301 may transfer the output second transmission signal to the second power distributor 302. In an actual embodiment, the first power distributor 301 may be replaced with a directional coupler and the like.

The second power distributor 302 may receive the second transmission signal from the first power distributor 301, and distribute the second transmission signal to output a third transmission signal and a fourth transmission signal. The second power distributor 302 may transfer the output third transmission signal to the first amplitude/phase converter 306 and transfer the output fourth transmission signal to the second amplitude/phase converter 308. In an actual embodiment, the second power distributor 302 may be replaced with a directional coupler and the like.

The digital signal processor 304 may detect a first leakage signal that is generated in association with the first transmission signal. The digital signal processor 304 may generate a first digital control signal for generating of a first converted signal based on the detected first leakage signal. The first converted signal will be described later. The first leakage signal may be an internal leakage signal that occurs in the RFID reader.

The first D/A converter 305 may convert the first digital control signal, generated by the digital signal processor 304, to an analog signal to thereby output a first analog control signal. The first D/A converter 305 may transfer the output first analog control signal to the first amplitude/phase converter 306. The first D/A converter 305 may control and convert each of an amplitude and a phase. Therefore, in an actual embodiment, the first D/A converter 305 may be constructed in a manner that two D/A converters constitute a pair.

The first amplitude/phase converter 306 may convert the amplitude and the phase of the third transmission signal output from the first power distributor 201 to thereby generate the first converted signal. For this, the first amplitude/phase converter 306 may use the first analog control signal output from the first D/A converter 305.

Specifically, the first amplitude/phase converter 306 may convert the amplitude of the output third transmission signal to be the same as an amplitude of the first leakage signal using the first analog control signal to thereby generate the first converted signal. The first amplitude/phase converter 306 may convert the phase of the output third transmission signal to be an inverse phase, that is, 180 degrees of the first leakage signal using the first analog control signal to thereby generate the first converted signal.

The digital signal processor 304 may detect a second leakage signal that is generated in association with the first transmission signal. The digital signal processor 304 may generate a second digital control signal for generating of a second converted signal based on the detected second leakage signal. The second converted signal will be described later. The second leakage signal may be an external leakage signal that occurs according to the change in surrounding environments of the transmit antenna 303 and a receive antenna 314.

The second D/A converter 307 may convert the second digital control signal, generated by the digital signal processor 304, to an analog signal to thereby output a second analog control signal. The second D/A converter 307 may transfer the output second analog control signal to the second amplitude/phase converter 308. The second D/A converter 307 may control and convert each of an amplitude and a phase. Therefore, in an actual embodiment, the second D/A converter 307 may be constructed in a manner that two D/A converters constitute a pair.

The second amplitude/phase converter 308 may convert the amplitude and the phase of the fourth transmission signal output from the second power distributor 302 to thereby generate the second converted signal. For this, the second amplitude/phase converter 308 may use the second analog control signal output from the second D/A converter 307.

Specifically, the second amplitude/phase converter 308 may convert the amplitude of the output fourth transmission signal to be the same as an amplitude of the second leakage signal using the second analog control signal to thereby generate the second converted signal. The second amplitude/phase converter 308 may convert the phase of the output fourth transmission signal to be an inverse phase, that is, 180 degrees of the second leakage signal using the second analog control signal to thereby generate the second converted signal.

The first power combiner 312 may combine the first converted signal and the second converted signal by reflecting the first leakage signal. Specifically, the first power combiner 312 may combine the first converted signal, having the same amplitude and the inverse phase of the first leakage signal, with the second converted signal, having the same amplitude and the inverse phase of the second leakage signal, to transmit the combined signal to the second power combiner 313. In an actual embodiment, the first power combiner 312 may be replaced with a directional coupler and the like.

The second power combiner 313 may receive an output signal of the first power combiner 312 to combine the first leakage signal and the second leakage signal. In this instance, the second power combiner 313 may combine a signal, including the first leakage signal, the second leakage signal, and an RFID tag response signal that are received from the receive antenna 314, with the output signal of the first power combiner 312 to thereby suppress the first leakage signal and the second leakage signal. In an actual embodiment, the second power combiner 313 may be replaced with a directional coupler and the like.

The frequency down converter 311 may down-convert an output signal of the second power combiner 313 to an analog baseband signal. The frequency down converter 311 may demodulate a signal in which the first leakage signal and the second leakage signal are removed in the RFID tag response signal, that is, the signal received from the receive antenna 314 to thereby recover transmission information received from the RFID tag.

The first A/D converter 309 may convert the down-converted output signal of the second power combiner 313 to a digital baseband signal to supply the converted digital baseband signal to the digital signal processor 304. When the frequency down converter 311 is an I/Q demodulator, the first A/D converter 309 may perform digital signal conversion for data of a Q channel.

The second A/D converter 310 may convert the down-converted output signal of the second power combiner 313 to a digital baseband signal to supply the converted digital baseband signal to the digital signal processor 304. When the frequency down converter 311 is the I/Q demodulator, the second A/D converter 310 may perform digital signal conversion for data of an I channel.

As described above, according to an aspect of the present invention, the apparatus for suppressing the transmit leakage signal of the RFID reader may suppress the first leakage signal and the second leakage signal using the first and second amplitude/phase converters 306 and 308, and the first and second power combiners 312 and 313.

Specifically, the apparatus may effectively suppress two leakage signals with a different amplitude and phase, that is, the first leakage signal and the second leakage signal by controlling the first leakages signal and the second leakage signal using two independent first and second amplitude/phase converters 306 and 308. Accordingly, the apparatus may improve an isolation between transmission and reception to thereby improve an identification rate and an identification distance of an RFID tag.

Figure 4:
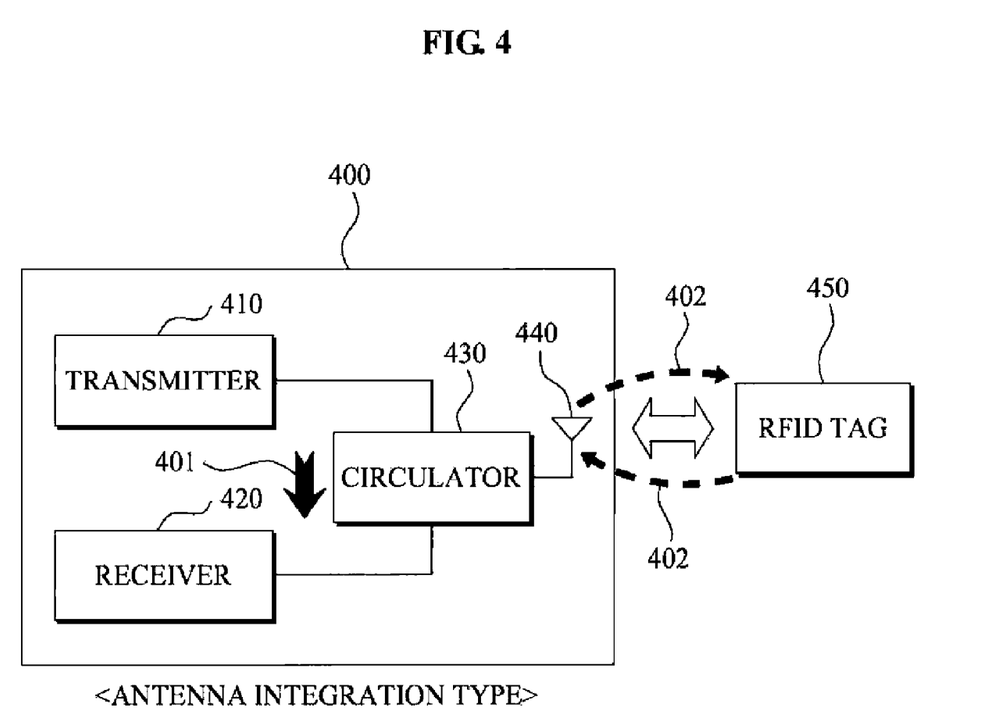
FIG. 4 illustrates an RFID system including an antenna integration type of an RFID reader according to an embodiment of the present invention.

FIG. 4 illustrates an RFID system including an antenna integration type of an RFID reader according to an embodiment of the present invention.

Referring to FIG. 4, the RFID system includes an antenna integration type of an RFID reader 400 and an RFID tag 450.

The RFID reader 400 includes a transmitter 410, a receiver 420, a circulator 430, and a transmit/receive antenna 440.

The transmitter 410 may output a transmission signal to transmit the output transmission signal to the circulator 430. The circulator 430 may receive the transmission signal and transfer the received transmission signal to the transmit/receive antenna 440. The transmit/receive antenna 440 may receive the transmission signal and transmit the received transmission signal to the RFID tag 450. In an actual embodiment, the circulator 430 may be replaced with a directional coupler and the like.

The RFID tag 450 may receive the transmission signal from the transmit/receive antenna 440 and transmit transmission information in response to the received transmission signal. The transmit/receive antenna 440 may receive the transmission information from the RFID tag 450 and transfer the received transmission information to the circulator 430. The circulator 430 may transfer the transmission information to the receiver 420. The receiver 420 may process the transmission information.

During the above transmission and reception process, leakage signals 401 and 402 corresponding to interference signals may occur due to a transmit leakage. Generally, the transmission signals 401 and 402 may occur via two paths. Firstly, when surrounding environments of the transmit/receive antenna 440 are fixed or insignificantly change, the transmission signal 401 may occur in the RFID reader 400. Secondly, when the RFID reader 400 identifies the RFID tag 450 attached to various types of articles, for example, paper, wood, plastic, metal, and the like, the leakage signal 402 may occur. Specifically, the leakage signal 402 may occur according to the change in the surrounding environments of the transmit/receive antenna 440.

Figure 5:
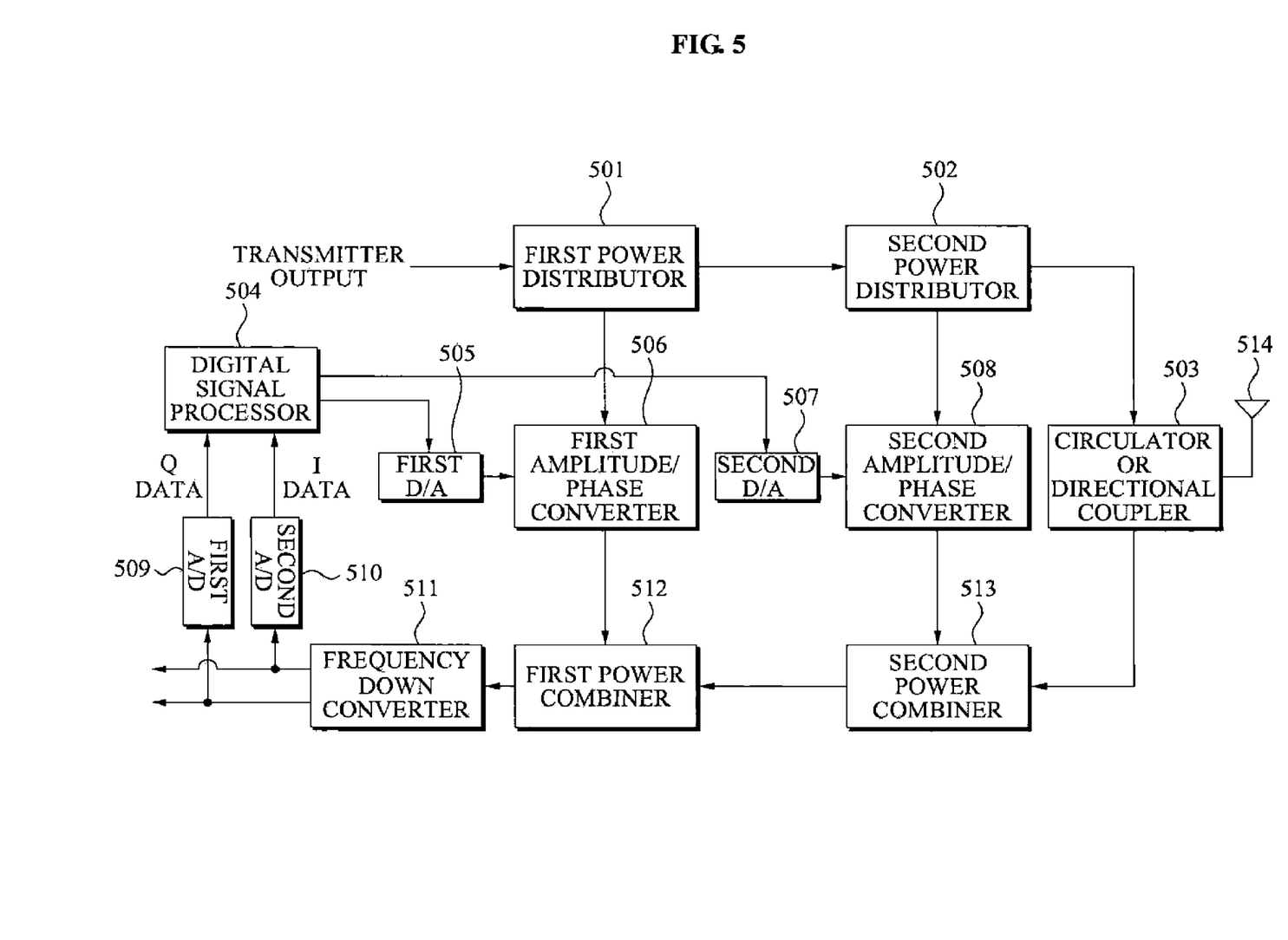
FIG. 5 is a block diagram illustrating an apparatus for suppressing a transmit leakage signal of an RFID reader according to still another embodiment of the present invention.

FIG. 5 is a block diagram illustrating an apparatus for suppressing a transmit leakage signal of an RFID reader according to still another embodiment of the present invention. Here, the apparatus for suppressing the transmit leakage signal may be installed in the RFID reader 400 of FIG. 4, that is, an antenna integration type RFID reader.

Referring to FIG. 5, the apparatus for suppressing the transmit leakage signal of the RFID reader may include a first power distributor 501, a second power distributor 502, a circulator 503, a digital signal processor 504, a first D/A converter 505, a first amplitude/phase converter 506, a second D/A converter 507, a second amplitude/phase converter 508, a first A/D converter 509, a second A/D converter 510, a frequency down converter 511, a first power combiner 512, and a second power combiner 513.

The first power distributor 501 may distribute a transmission signal to output a first transmission signal and a second transmission signal. The first power distributor 501 may transfer the output first transmission signal to the first amplitude/phase converter 506 and transfer the output second transmission signal to the second power distributor 502. In an actual embodiment, the first power distributor 501 may be replaced with a directional coupler and the like.

The second power distributor 502 may receive the second transmission signal from the first power distributor 501, and distribute the output second transmission signal to output a third transmission signal and a fourth transmission signal. The second power distributor 502 may transfer the output third transmission signal to the second amplitude/phase converter 508 and transfer the output fourth transmission signal to the circulator 503. In an actual embodiment, the second power distributor 502 may be replaced with a directional coupler and the like.

The circulator 503 may receive the fourth transmission signal from the second power distributor 502 and transfer the fourth transmission signal to a transmit/receive antenna 514. The transmit/receive antenna 514 may receive the fourth transmission signal and transfer the fourth transmission signal to an RFID tag (refer to the RFID tag 450 of FIG. 4). The transmit/receive antenna 514 may receive, from the RFID tag, a response signal corresponding to transmission information with respect to the fourth transmission signal. The circulator 503 may receive the response signal from the transmit/receive antenna 514 and transfer the response signal to the second power combiner 513. In an actual embodiment, the circulator 503 may be replaced with a directional coupler and the like.

The digital signal processor 504 may detect a first leakage signal that is generated in association with the fourth transmission signal. The digital signal processor 504 may generate a first digital control signal for generating of a first converted signal based on the detected first leakage signal. The first converted signal will be described later. The first leakage signal may be an internal leakage signal that occurs in the RFID reader.

The first D/A converter 505 may convert the first digital control signal, generated by the digital signal processor 504, to an analog signal to thereby output a first analog control signal. The first D/A converter 505 may transfer the output first analog control signal to the first amplitude/phase converter 506. The first D/A converter 505 may control and convert each of amplitude and a phase. Therefore, in an actual embodiment, the first D/A converter 505 may be constructed in a manner that two D/A converters constitute a pair.

The first amplitude/phase converter 506 may convert the amplitude and the phase of the first transmission signal output from the first power distributor 501 to thereby generate the first converted signal. For this, the first amplitude/phase converter 506 may use the first analog control signal output from the first D/A converter 505.

Specifically, the first amplitude/phase converter 506 may convert the amplitude of the output first transmission signal to be the same as an amplitude of the first leakage signal using the first analog control signal to thereby generate the first converted signal. The first amplitude/phase converter 506 may convert the phase of the output first transmission signal to be an inverse phase, that is, 180 degrees of the first leakage signal using the first analog control signal to thereby generate the first converted signal.

The digital signal processor 504 may detect a second leakage signal that is generated in association with the fourth transmission signal. The digital signal processor 504 may generate a second digital control signal for generating of the second a converted signal based on the detected second leakage signal. The second converted signal will be described later. The second leakage signal may be an external leakage signal that occurs according to the change in surrounding environments of the transmit/receive antenna 514.

The second D/A converter 507 may convert the second digital control signal, generated by the digital signal processor 504, to an analog signal to thereby output a second analog control signal. The second D/A converter 507 may transfer the output second analog control signal to the second amplitude/phase converter 508. The second D/A converter 507 may control and convert each of an amplitude and a phase. Therefore, in an actual embodiment, the second D/A converter 507 may be constructed in a manner that two D/A converters constitute a pair.

The second amplitude/phase converter 508 may convert the amplitude and the phase of the third transmission signal output from the second power distributor 502 to thereby generate the second converted signal. For this, the second amplitude/phase converter 508 may use the second analog control signal output from the second D/A converter 507.

Specifically, the second amplitude/phase converter 508 may convert the amplitude of the output third transmission signal to be the same as an amplitude of the second leakage signal using the second analog control signal to thereby generate the second converted signal. The second amplitude/phase converter 508 may convert the phase of the output third transmission signal to be an inverse phase, that is, 180 degrees of the second leakage signal using the second analog control signal to thereby generate the second converted signal.

The first power combiner 512 may combine the first converted signal and the first leakage signal. Specifically, the first power combiner 512 may combine the first leakage signal with the first converted signal that has the same amplitude and the inverse phase of the first leakage signal to offset the amplitude and the phase of the first leakage signal and thereby suppress the first leakage signal.

Also, the first power combiner 512 may combine an output signal from the second power combiner 513 with the first converted signal from the first amplitude/phase converter 506 and thereby suppress the first leakage signal. In an actual embodiment, the first power combiner 512 may be replaced with a directional coupler and the like.

The second power combiner 513 may combine the second converted signal and the second leakage signal. The second power combiner 513 may combine a signal, including the second leakage signal and an RFID tag response signal received from the transmit/receive antenna 514, with the second converted signal received from the second amplitude/phase converter 508 to offset the amplitude and the phase of the second leakage signal and thereby suppress the second leakage signal. In an actual embodiment, the second power combiner 513 may be replaced with a directional coupler and the like.

The frequency down converter 511 may down-convert an output signal of the first power combiner 212 to an analog baseband signal. The frequency down converter 511 may down-convert an output signal of the second power combiner 513 to an analog baseband signal.

The frequency down converter 511 may demodulate a signal in which the second leakage signal is removed in the RFID tag response signal, that is, the signal received from the receive antenna 214 to thereby recover transmission information received from the RFID tag. Here, the second leakage signal may be a leakage signal transferred via the circulator 503.

The first A/D converter 509 may convert the down-converted output signal of the first power combiner 512 to a digital baseband signal to supply the converted digital baseband signal to the digital signal processor 504. When the frequency down converter 511 is an I/Q demodulator, the first A/D converter 509 may perform digital signal conversion for data of a Q channel.

The second A/D converter 510 may convert the down-converted output signal of the first power combiner 512 to a digital baseband signal to supply the converted digital baseband signal to the digital signal processor 504. When the frequency down converter 511 is the I/Q demodulator, the second A/D converter 510 may perform digital signal conversion for data of an I channel.

According to an aspect of the present invention, the first amplitude/phase converter 506 and the first power combiner 512 may suppress the first leakage signal occurring in the RFID reader. The second power combiner 513 and the second amplitude/phase converter 508 may suppress the second leakage signal occurring according to the change in surrounding environments of the transmit/receive antenna 514.

According to another aspect of the present invention, the first amplitude/phase converter 506 and the first power combiner 512 may suppress the second leakage signal occurring according to the change in surrounding environments of the transmit/receive antenna 514. The second power combiner 513 and the second amplitude/phase converter 508 may suppress the first leakage signal occurring in the RFID reader.

As described above, according to embodiments of the present invention, it is possible to effectively suppress the first leakage signal and the second leakage signal with a different amplitude and phase by controlling the first leakage signal and the second leakage signal using two independent amplitude/phase converters, for example, the first amplitude/phase converter 506 and the second amplitude/phase converter 508.

Figure 6:
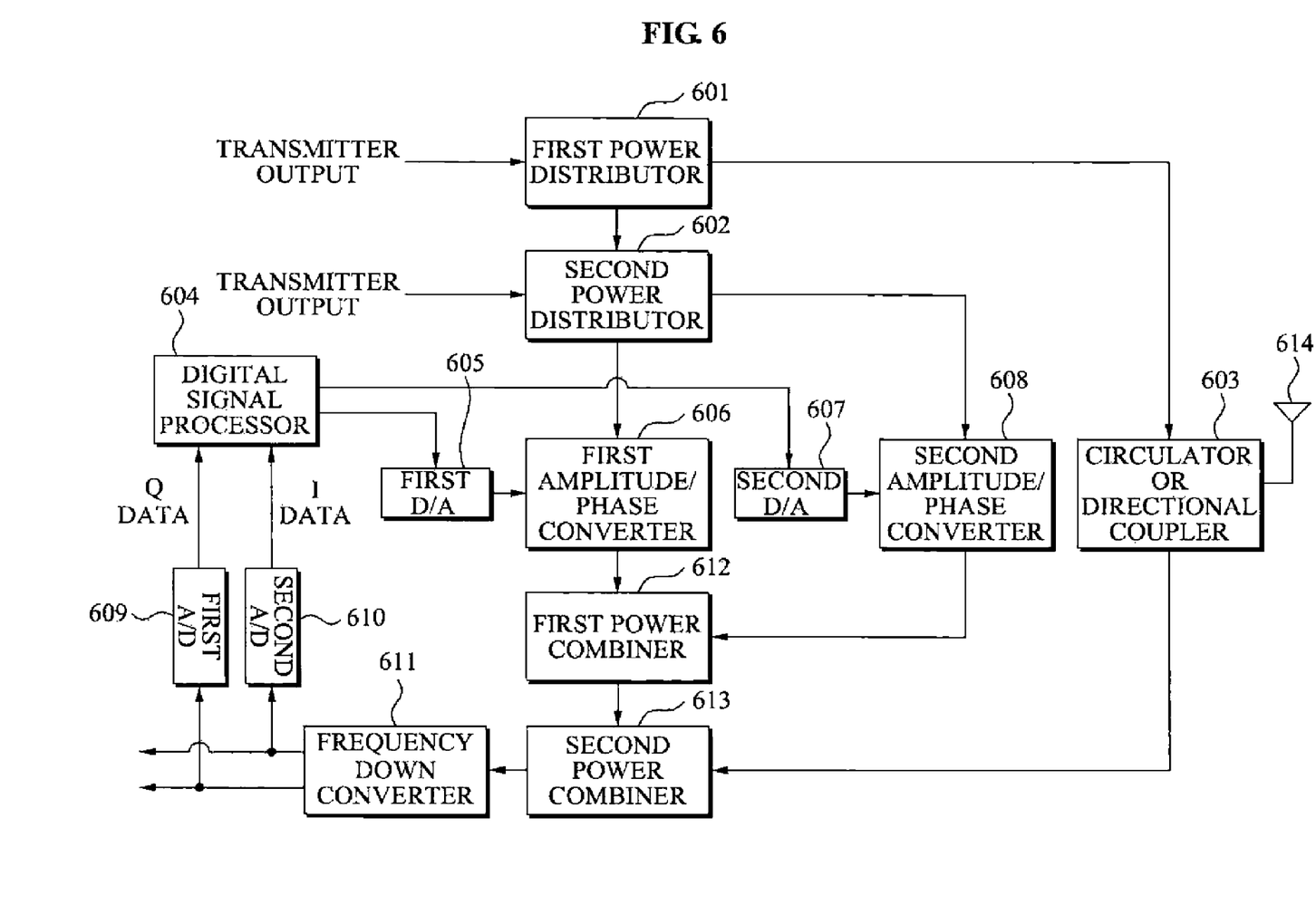
FIG. 6 is a block diagram illustrating an apparatus for suppressing a transmit leakage signal of an RFID reader according to yet another embodiment of the present invention.

FIG. 6 is a block diagram illustrating an apparatus for suppressing a transmit leakage signal of an RFID reader according to yet another embodiment of the present invention. Here, the apparatus for suppressing the transmit leakage signal may be installed in the RFID reader 400 of FIG. 4, that is, an antenna integration type RFID reader.

Referring to FIG. 6, the apparatus for suppressing the transmit leakage signal of the RFID reader may include a first power distributor 601, a second power distributor 602, a circulator 603, a digital signal processor 604, a first D/A converter 605, a first amplitude/phase converter 606, a second D/A converter 607, a second amplitude/phase converter 608, a first A/D converter 609, a second A/D converter 610, a frequency down converter 611, a first power combiner 612, and a second power combiner 613.

The first power distributor 601 may distribute a transmission signal to output a first transmission signal and a second transmission signal. The first power distributor 601 may transfer the output first transmission signal to the circulator 603 and transfer the output second transmission signal to the second power distributor 602. In an actual embodiment, the first power distributor 301 may be replaced with a directional coupler and the like.

The second power distributor 602 may receive the second transmission signal from the first power distributor 601, and distribute the output second transmission signal to output a third transmission signal and a fourth transmission signal. The second power distributor 602 may transmit the output third transmission signal to the first amplitude/phase converter 606 and transfer the output fourth transmission signal to the second amplitude/phase converter 608. In an actual embodiment, the second power distributor 602 may be replaced with a directional coupler and the like.

The circulator 603 may receive the first transmission signal from the first power distributor 601 and transfer the received first transmission signal to a transmit/receive antenna 614. The transmit/receive antenna 614 may transmit the transferred first transmission signal to an RFID tag (refer to the RFID tag 450 of FIG. 4). The transmit/receive antenna 614 may receive, from the RFID tag, a response signal corresponding to transmission information with respect to the first transmission signal. The circulator 603 may receive the response signal from the transmit/receive antenna 614 and transfer the response signal to the second power combiner 613. In an actual embodiment, the circulator 603 may be replaced with a directional coupler and the like.

The digital signal processor 604 may detect a first leakage signal that is generated in association with the first transmission signal. The digital signal processor 604 may generate a first digital control signal for generating of a first converted signal based on the detected first leakage signal. The first converted signal will be described later. The first leakage signal may be an internal leakage signal that occurs in the RFID reader.

The first D/A converter 605 may convert the first digital control signal, generated by the digital signal processor 604, to an analog signal to thereby output a first analog control signal. The first D/A converter 605 may transfer the output first analog control signal to the first amplitude/phase converter 606. The first D/A converter 605 may control and convert each of amplitude and a phase. Therefore, in an actual embodiment, the first D/A converter 605 may be constructed in a manner that two D/A converters constitute a pair.

The first amplitude/phase converter 606 may convert the amplitude and the phase of the third transmission signal output from the first power distributor 601 to thereby generate the first converted signal. For this, the first amplitude/phase converter 606 may use the first analog control signal output from the first D/A converter 605.

Specifically, the first amplitude/phase converter 606 may convert the amplitude of the output third transmission signal to be the same as an amplitude of the first leakage signal using the first analog control signal to thereby generate the first converted signal. The first amplitude/phase converter 606 may convert the phase of the output third transmission signal to be an inverse phase, that is, 180 degrees of the first leakage signal using the first analog control signal to thereby generate the first converted signal.

The digital signal processor 604 may detect a second leakage signal that is generated in association with the first transmission signal. The digital signal processor 604 may generate a second digital control signal for generating of the second converted signal based on the detected second leakage signal. The second converted signal will be described later. The second leakage signal may be an external leakage signal that occurs according to the change in surrounding environments of the transmit/receive antenna 614.

The second D/A converter 607 may convert the second digital control signal, generated by the digital signal processor 604, to an analog signal to thereby output a second analog control signal. The second D/A converter 607 may transfer the output second analog control signal to the second amplitude/phase converter 608. The second D/A converter 607 may control and convert each of an amplitude and a phase. Therefore, in an actual embodiment, the second D/A converter 607 may be constructed in a manner that two D/A converters constitute a pair.

The second amplitude/phase converter 608 may convert the amplitude and the phase of the fourth transmission signal output from the second power distributor 602 to thereby generate the second converted signal. For this, the second amplitude/phase converter 608 may use the second analog control signal output from the second D/A converter 607.

Specifically, the second amplitude/phase converter 608 may convert the amplitude of the output fourth transmission signal to be the same as an amplitude of the second leakage signal using the second analog control signal to thereby generate the second converted signal. The second amplitude/phase converter 608 may convert the phase of the output fourth transmission signal to be an inverse phase, that is, 180 degrees of the second leakage signal using the second analog control signal to thereby generate the second converted signal.

The first power combiner 612 may combine the first converted signal and the second converted signal by reflecting the first leakage signal. Specifically, the first power combiner 612 may combine the first converted signal, having the same amplitude and the inverse phase of the first leakage signal, with the second converted signal, having the same amplitude and the inverse phase of the second leakage signal, to transmit the combined signal to the second power combiner 613.

The first power combiner 612 may transmit, to the second power combiner 613, an output signal according to the combining of the first converted signal and the first leakage signal. In an actual embodiment, the first power combiner 612 may be replaced with a directional coupler and the like.

The second power combiner 613 may receive the output signal of the first power combiner 612 to combine the first leakage signal and the second leakage signal. In this instance, the second power combiner 613 may combine a signal, including the second leakage signal and an RFID tag response signal that are received from the transmit/receive antenna 614, with the output signal of the first power combiner 612 to thereby suppress the first leakage signal and the second leakage signal. In an actual embodiment, the second power combiner 613 may be replaced with a directional coupler and the like.

The frequency down converter 611 may down-convert an output signal of the second power combiner 613 to an analog baseband signal. The frequency down converter 611 may demodulate a signal in which the first leakage signal and the second leakage signal are removed in the RFID tag response signal, that is, the signal received from the transmit/receive antenna 614 to thereby recover transmission information received from the RFID tag.

The first A/D converter 609 may convert the down-converted output signal of the second power combiner 613 to a digital baseband signal to supply the converted digital baseband signal to the digital signal processor 604. When the frequency down converter 611 is an I/Q demodulator, the first A/D converter 609 may perform digital signal conversion for data of a Q channel.

The second A/D converter 610 may convert the down-converted output signal of the second power combiner 613 to a digital baseband signal to supply the converted digital baseband signal to the digital signal processor 604. When the frequency down converter 611 is the I/Q demodulator, the second A/D converter 310 may perform digital signal conversion for data of an I channel.

As described above, according to an aspect of the present invention, the apparatus for suppressing the transmit leakage signal of the RFID reader may effectively suppress the first leakage signal and the second leakage signal with a different amplitude and phase by controlling the first leakage signal and the second leakage signal using two independent first amplitude/phase converters 606 and 608.

Figure 7:
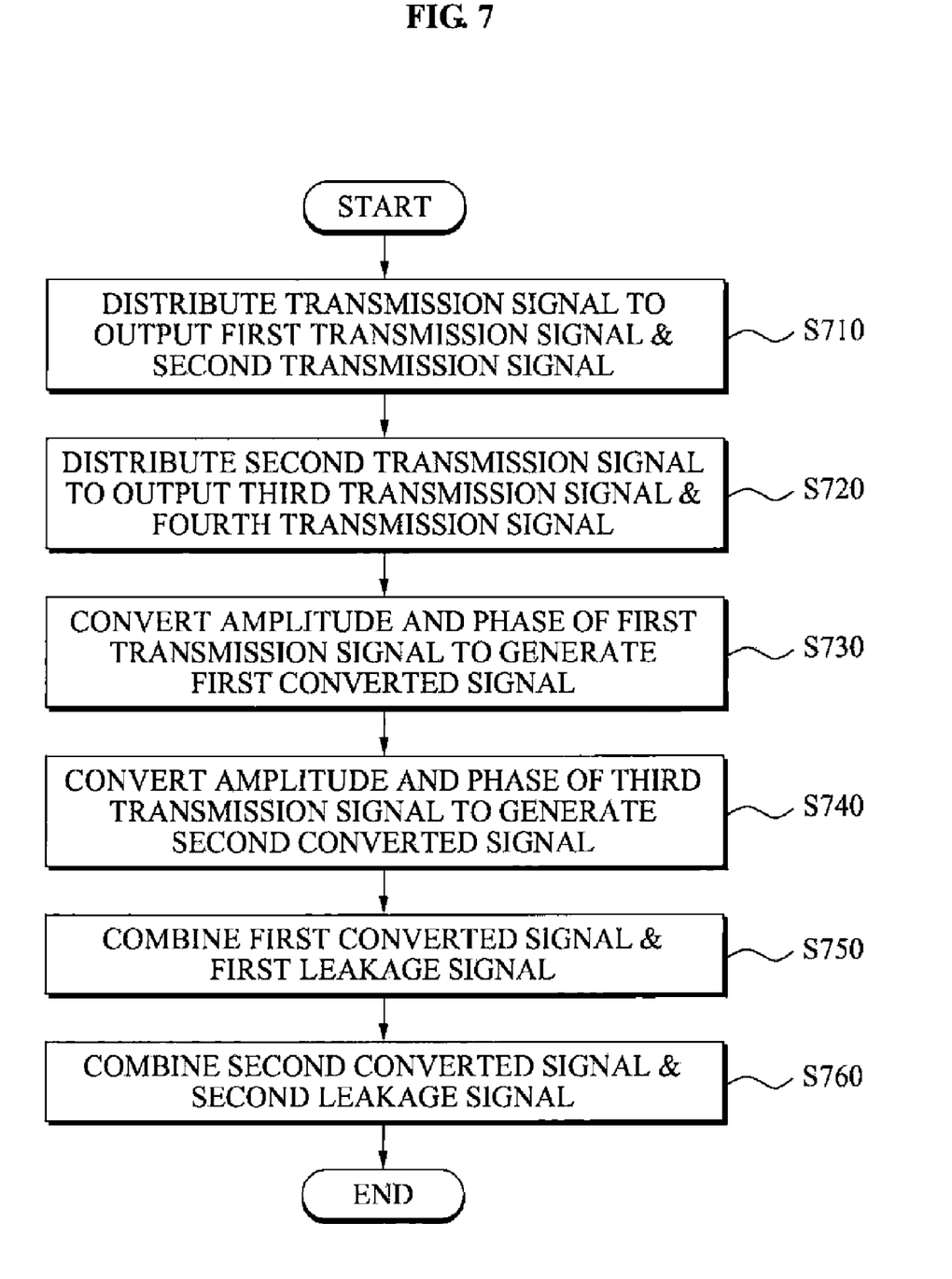
FIG. 7 is a flowchart illustrating a method of suppressing a transmit leakage signal of an RFID reader according to an embodiment of the present invention.

FIG. 7 is a flowchart illustrating a method of suppressing a transmit leakage signal of an RFID reader according to an embodiment of the present invention. Here, the method may be performed by an apparatus for suppressing the transmit leakage signal of the RFID reader. The apparatus may be installed in the antenna separation type RFID reader 100 of FIG. 1 or the antenna integration type RFID reader 400 of FIG. 4.

Referring to FIG. 7, in operation S710, the apparatus for suppressing the transmit leakage signal of the RFID reader may distribute a transmission signal to output a first transmission signal and a second transmission signal.

In operation S720, the apparatus may distribute the output second transmission signal to output a third transmission signal and a fourth transmission signal.

In operation S730, the apparatus may convert an amplitude and a phase of the output first transmission signal to generate a first converted signal. Specifically, the apparatus may convert the amplitude of the output first transmission signal to be the same as an amplitude of the first leakage signal to thereby generate the first converted signal. Here, the first leakage signal may occur in the RFID reader. Also, the apparatus may convert the phase of the output first transmission signal to be an inverse phase, 180 degrees, of the first leakage signal to thereby generate the first converted signal.

In operation S740, the apparatus may convert an amplitude and a phase of the output third transmission signal to generate a second converted signal. Specifically, the apparatus may convert the amplitude of the output third transmission signal to be the same as an amplitude of the second leakage signal to thereby generate the second converted signal. Here, the second leakage signal may occur according to the change in surrounding environments of the transmit/receive antenna of the RFID reader. Also, the apparatus may convert the phase of the output third transmission signal to be an inverse phase of the second leakage signal to thereby generate the second converted signal.

In operation S750, the apparatus may combine the first converted signal and the first leakage signal. Through this, the apparatus may suppress the first leakage signal and thereby reducing an interference phenomenon occurring due to the first leakage signal.

In operation S760, the apparatus may combine the second converted signal and the second leakage signal. Through this, the apparatus may suppress the second leakage signal and thereby reduce an interference phenomenon occurring due to the second leakage signal.

The apparatus may combine the first converted signal and the first leakage signal by reflecting an output signal according to combining of the second converted signal and the second leakage signal. Specifically, the apparatus may combine all of the output signal, the first converted signal, and the first leakage signal to thereby suppress the first leakage signal and the second leakage signal.

As described above, according to an aspect of the present invention, it is possible to effectively suppress leakage signals that occur via internal and external paths and thereby effectively improve an isolation between transmission and reception and improve an identification rate and an identification distance of an RFID system.

Figure 8:
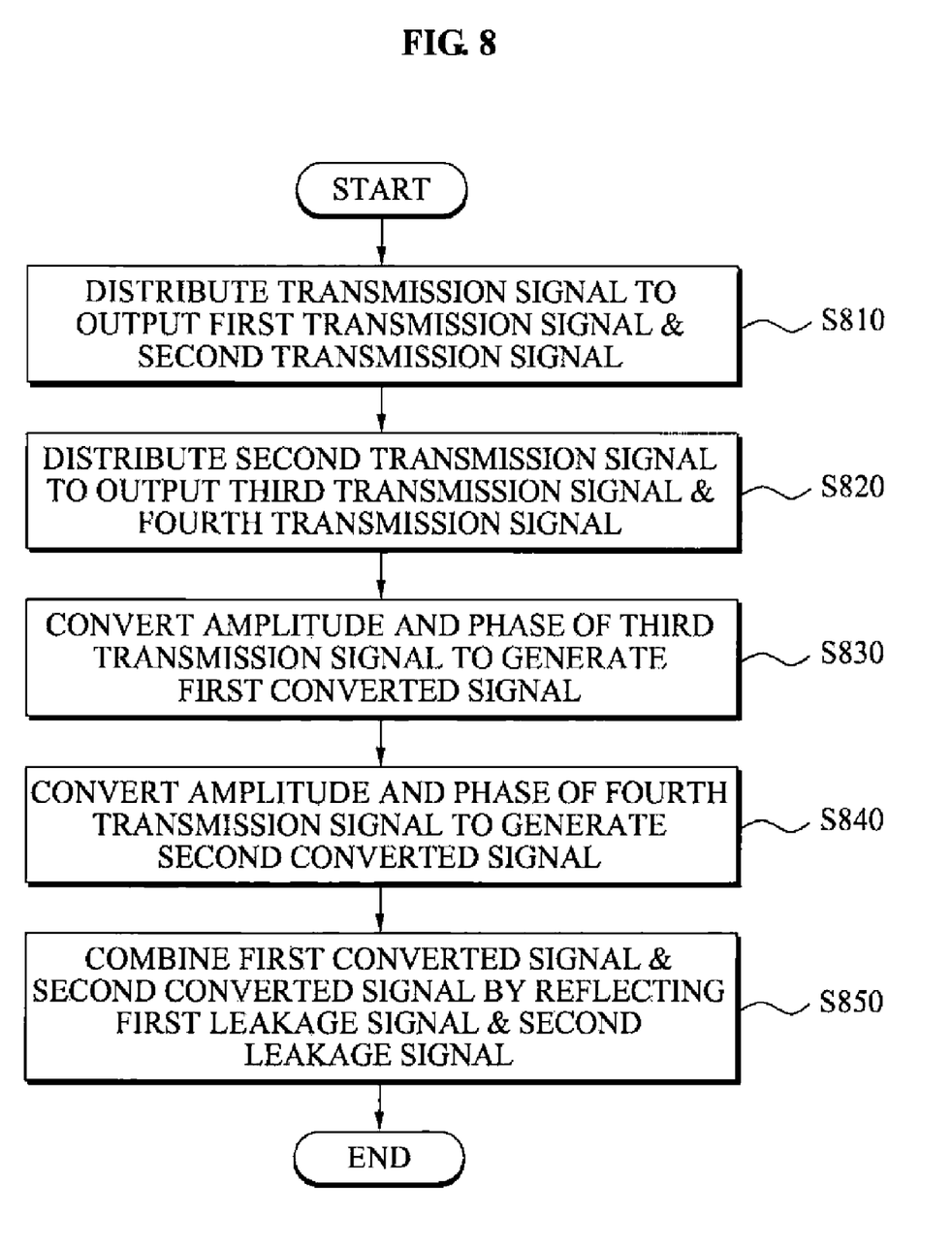
FIG. 8 is a flowchart illustrating a method of suppressing a transmit leakage signal of an RFID reader according to another embodiment of the present invention.

FIG. 8 is a flowchart illustrating a method of suppressing a transmit leakage signal of an RFID reader according to another embodiment of the present invention. Here, the method may be performed by an apparatus for suppressing the transmit leakage signal of the RFID reader. The apparatus may be installed in the antenna separation type RFID reader 100 of FIG. 1 or the antenna integration type RFID reader 400 of FIG. 4.

Referring to FIG. 8, in operation S810, the apparatus for suppressing the transmit leakage signal of the RFID reader may distribute a transmission signal to output a first transmission signal and a second transmission signal.

In operation S820, the apparatus may distribute the output second transmission signal to output a third transmission signal and a fourth transmission signal.

In operation S830, the apparatus may convert an amplitude and a phase of the output third transmission signal to generate a first converted signal. Specifically, the apparatus may convert the amplitude of the output third transmission signal to be the same as an amplitude of the first leakage signal to thereby generate the first converted signal. Here, the first leakage signal may occur in the RFID reader. Also, the apparatus may convert the phase of the output third transmission signal to be an inverse phase of the first leakage signal to thereby generate the first converted signal.

In operation S840, the apparatus may convert an amplitude and a phase of the output fourth transmission signal to generate a second converted signal. Specifically, the apparatus may convert the amplitude of the output fourth transmission signal to be the same as an amplitude of the second leakage signal to thereby generate the second converted signal. Here, the second leakage signal may occur according to the change in surrounding environments of the transmit/receive antenna of the RFID reader. Also, the apparatus may convert the phase of the output fourth transmission signal to be an inverse phase of the second leakage signal to thereby generate the second converted signal.

In operation S850, the apparatus may combine the first converted signal and the second converted signal by reflecting the first leakage signal and the second leakage signal. Specifically, the apparatus may combine all of the first leakage signal, the second leakage signal, the first converted signal, and the second converted signal to thereby suppress the first leakage signal and the second leakage signal.

As described above, according to an aspect of the present invention, it is possible to effectively suppress leakage signals that occur via internal and external paths and thereby effectively improve an isolation between transmission and reception and improve an identification rate and an identification distance of n RFID system.

The transmit leakage signal suppressing method according to the above-described exemplary embodiments may be recorded in computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. An apparatus for suppressing a transmit leakage signal of a radio frequency identification (RFID) reader, the apparatus comprising:
   a first power distributor distributing a transmission signal to output a first transmission signal and a second transmission signal;
   a second power distributor distributing the output second transmission signal to output a third transmission signal and a fourth transmission signal;
   a first amplitude/phase converter converting an amplitude and a phase of the output first transmission signal to generate a first converted signal;
   a second amplitude/phase converter converting an amplitude and a phase of the output third transmission signal to generate a second converted signal;
   a first power combiner combining the first converted signal with a first leakage signal that is generated in association with the output fourth transmission signal; and
   a second power combiner combining the second converted signal with a second leakage signal that is generated in association with the output fourth transmission signal.

2. The apparatus of claim 1, wherein the first amplitude/phase converter converts the amplitude of the output first transmission signal to be the same as an amplitude of the first leakage signal to thereby generate the first converted signal, and converts the phase of the output first transmission signal to be an inverse phase of the first leakage signal to thereby generate the first converted signal.

3. The apparatus of claim 1, wherein the second amplitude/phase converter converts the amplitude of the output third transmission signal to be the same as an amplitude of the second leakage signal to thereby generate the second converted signal, and converts the phase of the output third transmission signal to be an inverse phase of the second leakage signal to thereby generate the second converted signal.

4. The apparatus of claim 1, wherein the first power combiner combines the first converted signal and the first leakage signal by reflecting an output signal of the second power combiner.

5. The apparatus of claim 1, further comprising:
   a digital signal processor detecting the first leakage signal to generate a first digital control signal for generating of the first converted signal based on the detected first leakage signal; and
   a first digital-to-analog (D/A) converter converting the first digital control signal to an analog signal.

6. The apparatus of claim 1, further comprising:
   a digital signal processor detecting the second leakage signal to generate a second digital control signal for generating of the second converted signal based on the detected second leakage signal; and
   a second D/A converter converting the second digital control signal to an analog signal.

7. The apparatus of claim 1, further comprising:
   a frequency down converter down-converting an output signal of the first power combiner to an analog baseband signal; and
   a first analog-to-digital (A/D) converter and a second A/D converter converting the down-converted output signal of the first power combiner to a digital baseband signal.

8. An apparatus for suppressing a transmit leakage signal of an RFID reader, the apparatus comprising:
   a first power distributor distributing a transmission signal to output a first transmission signal and a second transmission signal;
   a second power distributor distributing the output second transmission signal to output a third transmission signal and a fourth transmission signal;
   a first amplitude/phase converter converting an amplitude and a phase of the output third transmission signal to generate a first converted signal;
   a second amplitude/phase converter converting an amplitude and a phase of the output fourth transmission signal to generate a second converted signal;
   a first power combiner combining the first converted signal and the second converted signal; and
   a second power combiner combining an output signal of the first power combiner with a first leakage signal and a second leakage signal that are generated in association with the output first transmission signal.

9. The apparatus of claim 8, wherein the first amplitude/phase converter converts the amplitude of the output third transmission signal to be the same as an amplitude of the first leakage signal to thereby generate the first converted signal, and converts the phase of the output third transmission signal to be an inverse phase of the first leakage signal to thereby generate the first converted signal.

10. The apparatus of claim 8, wherein the second amplitude/phase converter converts the amplitude of the output fourth transmission signal to be the same as an amplitude of the second leakage signal to thereby generate the second converted signal, and converts the phase of the output fourth transmission signal to be an inverse phase of the second leakage signal to thereby generate the second converted signal.

11. The apparatus of claim 8, further comprising:
   a digital signal processor detecting the first leakage signal to generate a first digital control signal for generating of the first converted signal based on the detected first leakage signal; and a first D/A converter converting the first digital control signal to an analog signal.

12. The apparatus of claim 8, further comprising:
a digital signal processor detecting the second leakage signal to generate a second digital control signal for generating of the second converted signal based on the detected second leakage signal; and
a second D/A converter converting the second digital control signal to an analog signal.

13. The apparatus of claim 8, further comprising:
a frequency down converter down-converting an output signal of the first power combiner to an analog baseband signal; and
a first A/D converter and a second A/D converter converting the down-converted output signal of the first power combiner to a digital baseband signal.

14. A method of suppressing a transmit leakage signal of an RFID reader, the method comprising:
distributing a transmission signal to output a first transmission signal and a second transmission signal;
distributing the output second transmission signal to output a third transmission signal and a fourth transmission signal;
converting an amplitude and a phase of the output first transmission signal to generate a first converted signal;
converting an amplitude and a phase of the output third transmission signal to generate a second converted signal;
combining the first converted signal with a first leakage signal that is generated in association with the output fourth transmission signal; and
combining the second converted signal with a second leakage signal that is generated in association with the output fourth transmission signal.

15. The method of claim 14, wherein the converting of the amplitude and the phase of the first transmission signal to generate the first converted signal comprises:
converting the amplitude of the output first transmission signal to be the same as an amplitude of the first leakage signal to thereby generate the first converted signal; and
converting the phase of the output first transmission signal to be an inverse phase of the first leakage signal to thereby generate the first converted signal.

16. The method of claim 14, wherein the converting of the amplitude and the phase of the third transmission signal to generate the second converted signal comprises:
converting the amplitude of the output third transmission signal to be the same as an amplitude of the second leakage signal to thereby generate the second converted signal; and
converting the phase of the output third transmission signal to be an inverse phase of the second leakage signal to thereby generate the second converted signal.

17. The method of claim 14, wherein the combining of the first converted signal with the first leakage signal comprises combining the first converted signal and the first leakage signal by reflecting an output signal according to the combining of the second converted signal and the second leakage signal.

18. A method of suppressing a transmit leakage signal of an RFID reader, the method comprising:
distributing a transmission signal to output a first transmission signal and a second transmission signal;
distributing the output second transmission signal to output a third transmission signal and a fourth transmission signal;
converting an amplitude and a phase of the output third transmission signal to generate a first converted signal;
converting an amplitude and a phase of the output fourth transmission signal to generate a second converted signal;
combining the first converted signal and the second converted signal by reflecting a first leakage signal and a second leakage signal that are generated in association with the output first transmission signal; and
combining an output signal according to the combining the first converted signal and the second converted signal, with the first leakage signal and the second leakage signal.

19. The method of claim 18, wherein the converting of the amplitude and the phase of the third transmission signal to generate the first converted signal comprises:
converting the amplitude of the output third transmission signal to be the same as an amplitude of the first leakage signal to thereby generate the first converted signal; and
converting the phase of the output third transmission signal to be an inverse phase of the first leakage signal to thereby generate the first converted signal.

20. The method of claim 18, wherein the converting of the amplitude and the phase of the fourth transmission signal to generate the second converted signal comprises:
converting the amplitude of the output fourth transmission signal to be the same as an amplitude of the second leakage signal to thereby generate the second converted signal; and
converting the phase of the output fourth transmission signal to be an inverse phase of the second leakage signal to thereby generate the second converted signal.

* * * * *